US009705600B1

(12) United States Patent
Ryan et al.

(10) Patent No.: US 9,705,600 B1
(45) Date of Patent: Jul. 11, 2017

(54) METHOD AND SYSTEM FOR OPTICAL COMMUNICATION

(71) Applicant: ABL IP HOLDING LLC, Conyers, GA (US)

(72) Inventors: Daniel Ryan, North Andover, MA (US); Aaron Ganick, North Reading, MA (US); Kelby Green, Cambridge, MA (US); Emanuel Malandrakis, Boston, MA (US); Gary Fuchs, Princeton, MA (US)

(73) Assignee: ABL IP HOLDING LLC, Conyers, GA (US)

( * ) Notice: Subject to any disclaimer, the term of this patent is extended or adjusted under 35 U.S.C. 154(b) by 293 days.

(21) Appl. No.: 14/297,254

(22) Filed: Jun. 5, 2014

Related U.S. Application Data

(60) Provisional application No. 61/831,380, filed on Jun. 5, 2013.

(51) Int. Cl.
*H04N 7/18* (2006.01)
*H04B 10/50* (2013.01)
*H05B 33/08* (2006.01)
*H04B 10/524* (2013.01)
*H04B 10/564* (2013.01)
*H04B 10/548* (2013.01)
*H04B 10/54* (2013.01)

(52) U.S. Cl.
CPC ......... *H04B 10/502* (2013.01); *H04B 10/524* (2013.01); *H04B 10/54* (2013.01); *H04B 10/548* (2013.01); *H04B 10/564* (2013.01); *H05B 33/089* (2013.01); *H05B 33/0848* (2013.01)

(58) Field of Classification Search
CPC .... H04B 10/502; H04B 10/54; H04B 10/548; H04B 10/564; H04B 10/524; H05B 33/089; H05B 33/0848
USPC ......................................................... 348/61
See application file for complete search history.

(56) References Cited

U.S. PATENT DOCUMENTS

| 4,275,385 A | 6/1981 | White |
| 5,148,159 A | 9/1992 | Clark |

(Continued)

FOREIGN PATENT DOCUMENTS

| EP | 1 715 704 A1 | 10/2006 |
| EP | 2737779 | 6/2014 |

(Continued)

OTHER PUBLICATIONS

Final Office Action dated Dec. 15, 2015, issued in U.S. Appl. No. 14/210,832, filed Mar. 14, 2014.

(Continued)

*Primary Examiner* — Allen Wong
(74) *Attorney, Agent, or Firm* — RatnerPrestia

(57) ABSTRACT

In various embodiments of the present invention data is transmitted in light emitted by a light source by generating a continuous-time data signal and generating, based thereon, a drive signal that provides power to the light source, thereby causing the light source to emit light; variations in the amplitude of the drive signal represent information in the continuous-time data signal. A change in average power delivered to the light source as a result of the variations in the amplitude of the drive signal is detected and power to the light source is adjusted to compensate.

16 Claims, 10 Drawing Sheets

(56) References Cited

U.S. PATENT DOCUMENTS

| | | | |
|---|---|---|---|
| 5,521,345 A | 5/1996 | Wulc | |
| 5,712,839 A | 1/1998 | Aoki | |
| 6,198,230 B1 | 3/2001 | Leeb | |
| 6,400,482 B1 | 6/2002 | Lupton | |
| 6,426,599 B1 | 7/2002 | Leeb | |
| 6,450,816 B1 | 9/2002 | Gerber | |
| 6,462,692 B1* | 10/2002 | Moriya | H03M 1/825 |
| | | | 341/144 |
| 6,495,783 B2 | 12/2002 | Rochon | |
| 6,504,633 B1 | 1/2003 | Hovorka | |
| 6,539,400 B1 | 3/2003 | Bloomfield | |
| 6,548,967 B1 | 4/2003 | Dowling | |
| 6,590,687 B1 | 7/2003 | Olsen | |
| 6,608,453 B2 | 8/2003 | Morgan | |
| 6,614,126 B1 | 9/2003 | Mitchell | |
| 6,701,092 B2 | 3/2004 | Doucet | |
| 6,710,818 B1 | 3/2004 | Kasahara | |
| 6,794,831 B2 | 9/2004 | Leeb | |
| 6,807,478 B2 | 10/2004 | Giannopoulos | |
| 6,865,347 B2 | 3/2005 | Perkins | |
| 6,954,591 B2 | 10/2005 | Lupton | |
| 6,985,744 B2 | 1/2006 | Katagishi | |
| 7,016,115 B1 | 3/2006 | Leeb | |
| 7,022,928 B2 | 4/2006 | Watanabe | |
| 7,123,159 B2 | 10/2006 | Giannopoulos | |
| 7,230,196 B2 | 6/2007 | Toyama | |
| 7,265,307 B2 | 9/2007 | Miyasaka | |
| 7,309,965 B2 | 12/2007 | Dowling | |
| 7,352,972 B2 | 4/2008 | Franklin | |
| 7,415,212 B2 | 8/2008 | Matsushita | |
| 7,446,276 B2 | 11/2008 | Plesko | |
| 7,446,671 B2 | 11/2008 | Giannopoulos | |
| 7,449,654 B2 | 11/2008 | Tsuduki | |
| 7,471,315 B2 | 12/2008 | Silsby | |
| 7,525,059 B2 | 4/2009 | Masuda | |
| 7,547,858 B2 | 6/2009 | Nagata | |
| 7,583,901 B2 | 9/2009 | Nakagawa | |
| 7,683,954 B2 | 3/2010 | Ichikawa | |
| 7,724,301 B2 | 5/2010 | Alakarhu | |
| 7,738,884 B2 | 6/2010 | Cheung | |
| 7,741,573 B2 | 6/2010 | Masuda | |
| 7,796,780 B2 | 9/2010 | Lipton | |
| 7,912,377 B2 | 3/2011 | Koga | |
| 7,969,297 B2 | 6/2011 | Haartsen | |
| 7,970,537 B2 | 6/2011 | Ann | |
| 7,973,819 B2 | 7/2011 | Shimada | |
| 8,107,825 B2 | 1/2012 | Rajagopal | |
| 8,131,154 B2 | 3/2012 | Murayama | |
| 8,195,054 B2 | 6/2012 | Son | |
| 8,213,801 B2 | 7/2012 | Nien | |
| 8,248,467 B1 | 8/2012 | Ganick | |
| 8,334,898 B1 | 12/2012 | Ryan | |
| 8,334,901 B1 | 12/2012 | Ganick | |
| 8,379,107 B2 | 2/2013 | Chen | |
| 8,416,290 B2 | 4/2013 | Ryan | |
| 8,432,438 B2 | 4/2013 | Ryan | |
| 8,436,896 B2 | 5/2013 | Staats | |
| 8,457,502 B2 | 6/2013 | Ryan | |
| 8,494,218 B2 | 7/2013 | Chen | |
| 8,520,065 B2 | 8/2013 | Staats | |
| 8,866,391 B2 | 10/2014 | Ganick | |
| 8,947,513 B2 | 2/2015 | Ganick et al. | |
| 8,957,951 B1 | 2/2015 | Ganick et al. | |
| 8,964,016 B2 | 2/2015 | Ganick et al. | |
| 8,994,799 B2 | 3/2015 | Ganick et al. | |
| 8,994,814 B2 | 3/2015 | Ganick et al. | |
| 9,054,803 B1 | 6/2015 | Ganick | |
| 9,055,200 B1 | 6/2015 | Ganick | |
| 2001/0035905 A1 | 11/2001 | Auffret | |
| 2004/0013314 A1 | 1/2004 | Peli | |
| 2004/0204848 A1 | 10/2004 | Matsuo | |
| 2004/0256211 A1 | 12/2004 | Chen | |
| 2005/0177423 A1 | 8/2005 | Swanson | |
| 2005/0232642 A1 | 10/2005 | Egner | |
| 2006/0038916 A1 | 2/2006 | Knoedgen et al. | |
| 2006/0045311 A1 | 3/2006 | Shibuya | |
| 2006/0056855 A1 | 3/2006 | Nakagawa | |
| 2006/0071614 A1* | 4/2006 | Tripathi | H05B 33/0815 |
| | | | 315/291 |
| 2006/0119287 A1 | 6/2006 | Campbell | |
| 2006/0157760 A1 | 7/2006 | Hayashi | |
| 2006/0287113 A1 | 12/2006 | Small | |
| 2007/0139405 A1 | 6/2007 | Marcinkiewicz | |
| 2007/0254694 A1 | 11/2007 | Nakagwa | |
| 2007/0275750 A1 | 11/2007 | Nakagawa | |
| 2008/0028013 A1 | 1/2008 | Kamegawa | |
| 2008/0077326 A1 | 3/2008 | Funk | |
| 2008/0131140 A1 | 6/2008 | Shin | |
| 2008/0185969 A1 | 8/2008 | Vegter et al. | |
| 2008/0205477 A1 | 8/2008 | Hama | |
| 2009/0026978 A1* | 1/2009 | Robinson | H05B 37/0272 |
| | | | 315/294 |
| 2009/0027134 A1* | 1/2009 | Kurosawa | G01R 31/31922 |
| | | | 332/100 |
| 2009/0040367 A1 | 2/2009 | Zakrzewski | |
| 2009/0045955 A1 | 2/2009 | Ulrich | |
| 2009/0085500 A1 | 4/2009 | Zampini | |
| 2009/0157309 A1 | 6/2009 | Won | |
| 2009/0171571 A1 | 7/2009 | Son | |
| 2009/0245788 A1 | 10/2009 | Varshneya | |
| 2009/0269073 A1 | 10/2009 | Kitaji | |
| 2009/0284366 A1 | 11/2009 | Haartsen | |
| 2009/0310971 A1 | 12/2009 | Kim | |
| 2010/0006763 A1 | 1/2010 | Lentering et al. | |
| 2010/0014136 A1 | 1/2010 | Haussler | |
| 2010/0053342 A1 | 3/2010 | Hwang | |
| 2010/0151903 A1 | 6/2010 | Yamamoto | |
| 2010/0156907 A1 | 6/2010 | VanderSpek | |
| 2010/0159943 A1 | 6/2010 | Salmon | |
| 2010/0171875 A1 | 7/2010 | Yamamoto et al. | |
| 2010/0176732 A1 | 7/2010 | Schenk | |
| 2010/0207544 A1 | 8/2010 | Man | |
| 2010/0208236 A1 | 8/2010 | Damink | |
| 2010/0208986 A1 | 8/2010 | Cobb | |
| 2010/0219774 A1 | 9/2010 | Bianco | |
| 2010/0244746 A1 | 9/2010 | VanDeSluis | |
| 2010/0250185 A1 | 9/2010 | Marshall et al. | |
| 2010/0328490 A1 | 12/2010 | Kurane | |
| 2011/0026918 A1 | 2/2011 | Kim | |
| 2011/0032230 A1 | 2/2011 | Sun | |
| 2011/0069951 A1 | 3/2011 | Son | |
| 2011/0069962 A1 | 3/2011 | Castor et al. | |
| 2011/0105069 A1 | 5/2011 | Gaal | |
| 2011/0105134 A1 | 5/2011 | Kim | |
| 2011/0115816 A1 | 5/2011 | Brackney | |
| 2011/0135317 A1 | 6/2011 | Chaplin | |
| 2011/0136536 A1 | 6/2011 | Garudadri | |
| 2011/0137881 A1 | 6/2011 | Cheng | |
| 2011/0153201 A1 | 6/2011 | Park | |
| 2011/0176803 A1 | 7/2011 | Song | |
| 2011/0199017 A1* | 8/2011 | Dilger | H05B 33/0815 |
| | | | 315/291 |
| 2011/0222858 A1* | 9/2011 | Takahashi | H04B 10/548 |
| | | | 398/79 |
| 2011/0229130 A1 | 9/2011 | Yokoi | |
| 2011/0266959 A1 | 11/2011 | Taipale | |
| 2011/0298886 A1 | 12/2011 | Price | |
| 2011/0299857 A1 | 12/2011 | Rekimoto | |
| 2012/0019171 A1 | 1/2012 | Firhoj et al. | |
| 2012/0080944 A1 | 4/2012 | Recker | |
| 2012/0126909 A1 | 5/2012 | McCune | |
| 2012/0133815 A1 | 5/2012 | Nakanishi | |
| 2012/0155889 A1 | 6/2012 | Kim | |
| 2012/0256697 A1* | 10/2012 | Singerl | H03F 3/187 |
| | | | 332/109 |
| 2012/0328302 A1 | 12/2012 | Iizuka | |
| 2013/0026224 A1 | 1/2013 | Ganick | |
| 2013/0026940 A1 | 1/2013 | Ganick | |
| 2013/0026941 A1 | 1/2013 | Ganick | |
| 2013/0026942 A1 | 1/2013 | Ryan et al. | |
| 2013/0026945 A1 | 1/2013 | Ganick | |
| 2013/0027528 A1 | 1/2013 | Staats | |
| 2013/0027576 A1 | 1/2013 | Ryan et al. | |
| 2013/0028475 A1 | 1/2013 | Ganick | |

(56) References Cited

U.S. PATENT DOCUMENTS

| | | |
|---|---|---|
| 2013/0028609 A1 | 1/2013 | Staats |
| 2013/0028612 A1 | 1/2013 | Ryan et al. |
| 2013/0029682 A1 | 1/2013 | Ganick |
| 2013/0030747 A1 | 1/2013 | Ganick |
| 2013/0040380 A1 | 2/2013 | Hunt |
| 2013/0126713 A1 | 5/2013 | Haas |
| 2013/0141554 A1 | 6/2013 | Ganick |
| 2013/0141555 A1 | 6/2013 | Ganick |
| 2013/0208132 A1 | 8/2013 | Ryan |
| 2014/0045549 A1 | 2/2014 | Ryan |
| 2014/0086590 A1 | 3/2014 | Ganick |
| 2014/0139744 A1 | 5/2014 | Ryan |
| 2014/0280316 A1 | 9/2014 | Ganick |
| 2015/0147067 A1 | 5/2015 | Ryan |

FOREIGN PATENT DOCUMENTS

| | | | |
|---|---|---|---|
| EP | 2737779 A1 | 6/2014 | |
| JP | 2008-224536 A | 9/2008 | |
| JP | 2008224536 | 9/2008 | |
| KR | 20080022298 | 3/2008 | |
| KR | 1020080022298 A | 3/2008 | |
| WO | 2007/110791 A1 | 10/2007 | |
| WO | 2007110791 | 10/2007 | |
| WO | 2010146519 | 12/2010 | |
| WO | 2011/064332 A1 | 6/2011 | |
| WO | 2011064332 | 6/2011 | |
| WO | 2012093241 | 7/2012 | |
| WO | 2012/127439 A1 | 9/2012 | |
| WO | 2012127439 | 9/2012 | |
| WO | 2012/165800 A2 | 12/2012 | |
| WO | 2012165800 | 12/2012 | |
| WO | 2014/063150 A2 | 4/2014 | |
| WO | 2014063150 | 4/2014 | |
| WO | 2014/063150 A3 | 7/2014 | |

OTHER PUBLICATIONS

Final Office Action dated Nov. 17, 2015, issued in U.S. Appl. No. 13/718,233, filed Dec. 18, 2012.
Notice of Allowance issued Dec. 3, 2015 in U.S. Appl. No. 14/490,207, filed Sep. 18, 2014; entitled "Self Identifying Modulated Light Source."
EP Search Report in Application 12 817 835.7-1802 dated Nov. 27, 2015.
Notice of Allowance issued Jan. 12, 2016 in U.S. Appl. No. 14/163,772, filed Jan. 24, 2014, entitled "Method and System for Video Processing to Remove Noise From a Digital Video Sequence Containing a Modulated Light Signal."
Non-final Office Action dated Jan. 14, 2016 in U.S. Appl. No. 13/526,781, filed Jun. 19, 2012, entitled "Method and System for Modifying a Beacon Light Source for Use in a Light Based Positioning System."
Extended European Search Report received for European Patent Application No. 12817835.7, mailed on Mar. 23, 2015, 4 pages.
PCT International Patent Application No. PCT/US2014/067390, International Search Report and Written Opinion mailed Mar. 12, 2015, 13 pages.
Notice of Allowance issued Mar. 16, 2016 for U.S. Appl. No. 13/718,233, filed Dec. 18, 2012, entitled "Method and System for Configuring an Imaging Device for the Receiption of Digital Pulse Recognition Information."
Notice of Allowance issued Apr. 13, 2016 in U.S. Appl. No. 14/210,832, filed Mar. 14, 2014 entitled "Location-Based Mobile Services and Applications."
Notice of Allowance issued May 3, 2016 for U.S. Appl. No. 14/058,678 entitled "Self-Identifying One-Way Authentication Method Using Optical Signals."
Partial Supplementary European Search Report dated Apr. 7, 2016 for European Application No. 13847543.9.
Notice of Allowance issued May 10, 2016 in U.S. Appl. No. 14/163,772, filed Jan. 24. 2014, entitled "Method and System for Video Processing to Remov Noise From a Digital Video Sequence Containing a Modulated Light Signal."
Canadian Examination Report for Canadian Application No. 2892923, dated Jun. 8, 2016, 4 pages.
Davies, C. "VLC D-Light LED Networking Takes on Wifi and GPS," [Video] http://www.slashgear.com/vlc-d-light-led-networking-takes-on-wifi-and-gps-video-08170160/> Speech given Jul. 2011, Published to the Internet Aug. 8, 2011, Transcript attached, 3 pages.
Extended European Search Report received for European Patent Application No. 12817835.7, mailed on Mar. 23, 2015, 4 pgs.
Gursoy, et al., "On-Off Frequency-Shift Keying for Wideband Fading Channels," EURASIP Journal on Wireless Communications and Networking, Article 98564, pp. 1-15 (2006).
Haruyama, S., "Visible Light Communications: Recent Activities in Japan," Smart Spaces: A Smart Lighting ERC Industry—Academia Day at BU Photonics Center, Boston University (Feb. 8, 2011) (49 pages).
International Preliminary Report on Patentability received for PCT Patent Application No. PCT/US2012/048164, issued on Jan. 28, 2014, 8 pages.
International Preliminary Report on Patentability received for PCT Patent Application No. PCT/US2013/065923, mailed on Apr. 21, 2015.
International Search Report and Written Opinion issued for PCT/US2012/048164, dated Nov. 29, 2012, 13 pgs.
International Search Report received for PCT Patent Application No. PCT/US2013/065923, mailed on May 7, 2014, 4 pages.
Khan, T.A., "Visible Light Communications Using Wavelength Division Multiplexing," Thesis for Univ. of Engineering and Technology Lahore, Dept. of Elec. Engineering, (82 pages) (2006).
Liu, H.S. and Pang, G. "Positioning Beacon System Using Digital Camera and LEDs," IEEE Trans. Vehic. Tech., vol. 52(2): 403-419 (Mar. 2003).
Masaki Yoshino, Shinichiro Harauyama, and Masao Nakagawa; High-accuracy Positioning System using Visible LED Lights and Image Sensor, pp. 439-442, Radio and Wireless Symposium, 2008 IEEE; Date of Conference: Jan. 22-24, 2008.
Notice of Allowance mailed Jun. 12, 2015 in U.S. Appl. No. 13/369,144.
Office Action mailed Jul. 1, 2015 in U.S. Appl. No. 14/210,832.
Office Action mailed Jun. 11, 2015 in U.S. Appl. No. 13/718,233.
Office action mailed Jun. 15, 2015 in U.S. Appl. No. 14/019,376.
Office Action mailed Jun. 16, 2015 in U.S. Appl. No. 14/490,207.
Osborne, D., "New LED Ceiling Lights transmit data using visible light," http://www.geek.com/articles/chips/new-led-ceiling-lights-transmit-data-using-visible-light-20110117/ (Jan. 17, 2011) (2 pages).
Pohlmann, "Visible Light Communication," Seminar Kommunikationsstandards in Medizintechnik, Jun. 29, 2010 (14 pages).
Steven P. Nicklin, Robin D. Fisher, and Richard H. Middleton; Rolling Shutter Image Compensation; pp. 402-409; RoboCup 2006: Robot Soccer World Cup X, Lecture Notes in Computer Science, vol. 4434, 2007.
Tanaka et al. "New Position Detection Method Using Image Sensor and Visible Light LEDs," Second International Conference on Machine Vision, 2009, pp. 150-153.
Tjan, B.S., et al., "Digital sign system for indoor wayfinding for the visually impaired" Proceedings of the 2005 IEEE Computer Society Conference on Computer Vision and Pattern Recognition (CVPR)—Workshops, 3, 30A. San Diego, CA (8 pages).
Visible Light Communication (Vlc) Systems; <http://bemri.org/visible-light-communication.html> (Retrieved Mar. 10, 2012)—7 pages.
"Visible Light Communication (VLC) Systems", available online at <http://bemri.org/visible-lightcommunication. html> retrived on Mar. 10, 2012, 5 pages.
International Search Report and Written Opinion received for PCT Patent Application No. PCT/US2012/048164, mailed on Nov. 29, 2012, 13 pages.

(56) References Cited

OTHER PUBLICATIONS

Davies, Chris, "VLC D-Light LED Networking Takes on Wifi and GPS", available online at <http://www.slashgear.com/vlc-d-light-led-networking-takes-on-wifi-and-gps-video-08170160/>, Aug. 2011, 3 pages.

Gursoy et al.,"On-Off Frequency-Shift Keying for Wideband Fading Channels", EURASIP Journal on Wireless Communications and Networking, vol. 2006, 2006, pp. 1-15.

Haruyama, Shinichiro, "Visible Light Communications: Recent Activities in Japan", Smart Spaces: A Smart Lighting ERC Industry—Academia Day at BU Photonics Center, Boston University, Feb. 8, 2011, pp. 1-49.

Khan, T. A., "Visible Light Communications Using Wavelength Division Multiplexing", Thesis for, Department of Electrical Engineering, University of Engineering and Technology, Lahore, 2006, 82 pages.

Liu et al., "Positioning Beacon System Using Digital Camera and LEDs", IEEE Transactions on Vehicular Technology, vol. 52, No. 2, Mar. 2003, pp. 406-419.

Osborne, Doug, "New LED Ceiling Lights Transmit Data Using Visible Light", available online at <http://www.geek.com/chips/new-led-ceiling-lights-transmit-data-using-visible-light-1306065/>, Jan. 17, 2011, 2 pages.

Pohlmann, Christian, "Visible Light Communication", Seminar Kommunikationsstandards in der Medizintechnik, Jun. 29, 2010, pp. 1-14.

Tanaka et al., "New Position Detection Method Using Image Sensor and Visible Light LEDs", Second International Conference on Machine Vision, 2009, pp. 150-153.

Tjan et al.,"Diaital Sign System for Indoor Wayfinding for the Visually Impaired", IEEE Computer Society Conference on Computer Vision and Pattern Recognition—Workshops, Jun. 25, 2005, 8 pages.

Notice of Allowance issued Oct. 9, 2015 in U.S. Appl. No. 13/369,144, filed Feb. 8, 2012; entitled "Independent Beacon Based Light Position System".

Notice of Allowance issued Oct. 27, 2015 in U.S. Appl. No. 14/019,376, filed Sep. 5, 2013; entitled "Method for Hiding the Camera Preview View During Position Determination of a Mobile Device".

Non Final Office Action for U.S. Appl. No. 14/957,146, mailed Oct. 18, 2016, 24 pages.

Final Office Action for U.S. Appl. No. 13/526,781, mailed Jul. 26, 2016, 39 pages.

Extended European Search Report for European Application No. 13847543.9, dated Jul. 27, 2016.

Non Final Office Action for U.S. Appl. No. 15/049,869, mailed Nov. 3, 2016, 24 pages.

Notice of Allowance for U.S. Appl. No. 13/526,781, mailed Nov. 30, 2016, 15 pages.

Non Final Office Action for U.S. Appl. No. 14/991,344, mailed Nov. 30, 2016, 31 pages.

Non Final Office Action for U.S. Appl. No. 14/943,485, mailed Jan. 11, 2017, 28 pages.

Notice of Allowance for U.S. Appl. No. 14/957,146, mailed Jan. 11, 2017, 9 pages.

Notice of Allowance dated Mar. 1, 2017, issued in U.S. Appl. No. 15/049,869, titled "Self Identifying Modulated Light Source," 12 pages.

Non Final Office Action for U.S. Appl. No. 15/093,120, mailed Apr. 17, 2017, 26 pages.

Canadian Examination Search Report issued for Application No. CA 2,892,923, dated Apr. 25, 2017, 4 pages.

Lee, H. S., "A Phonton Modeling Method For The Characterization of Indoor Optical Wireless Communication," Progress In Elecgtromagnetics Research, PIER 92, 121-136, 2009, 16 pages.

\* cited by examiner

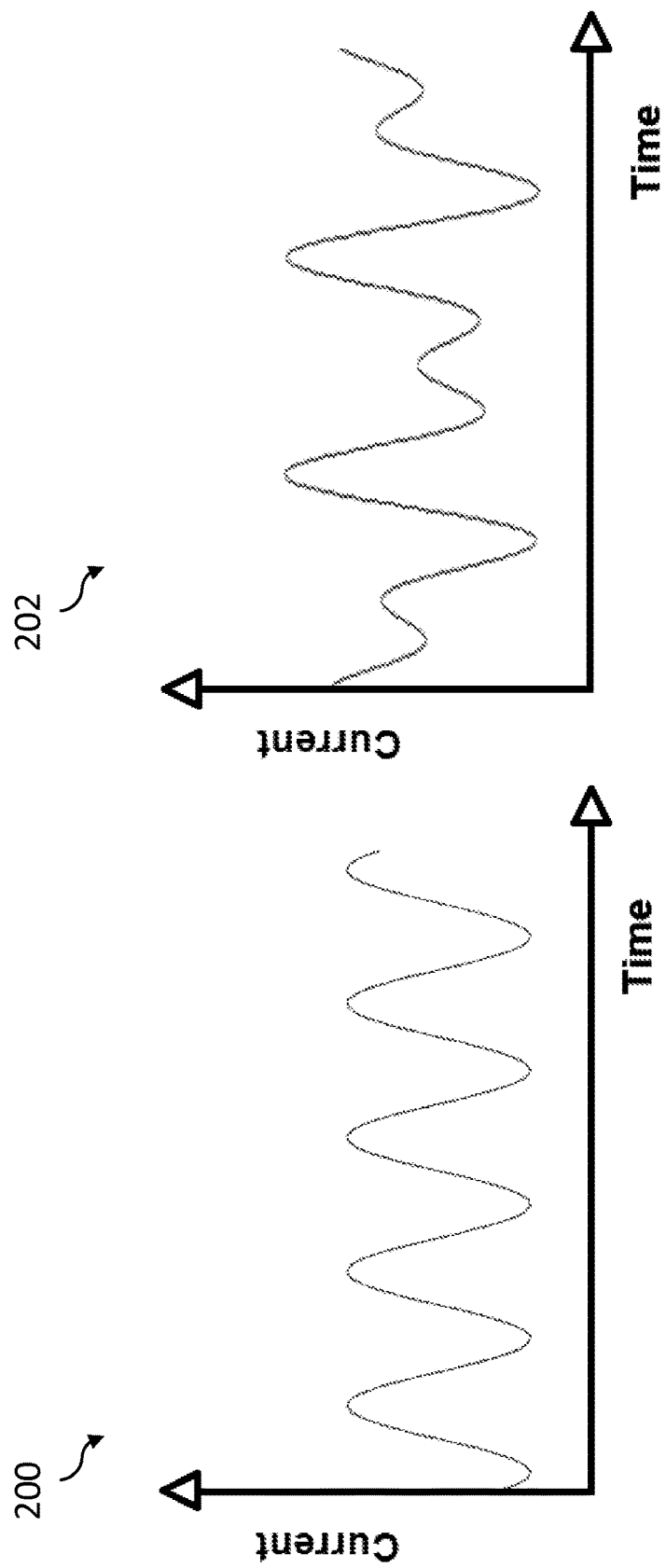

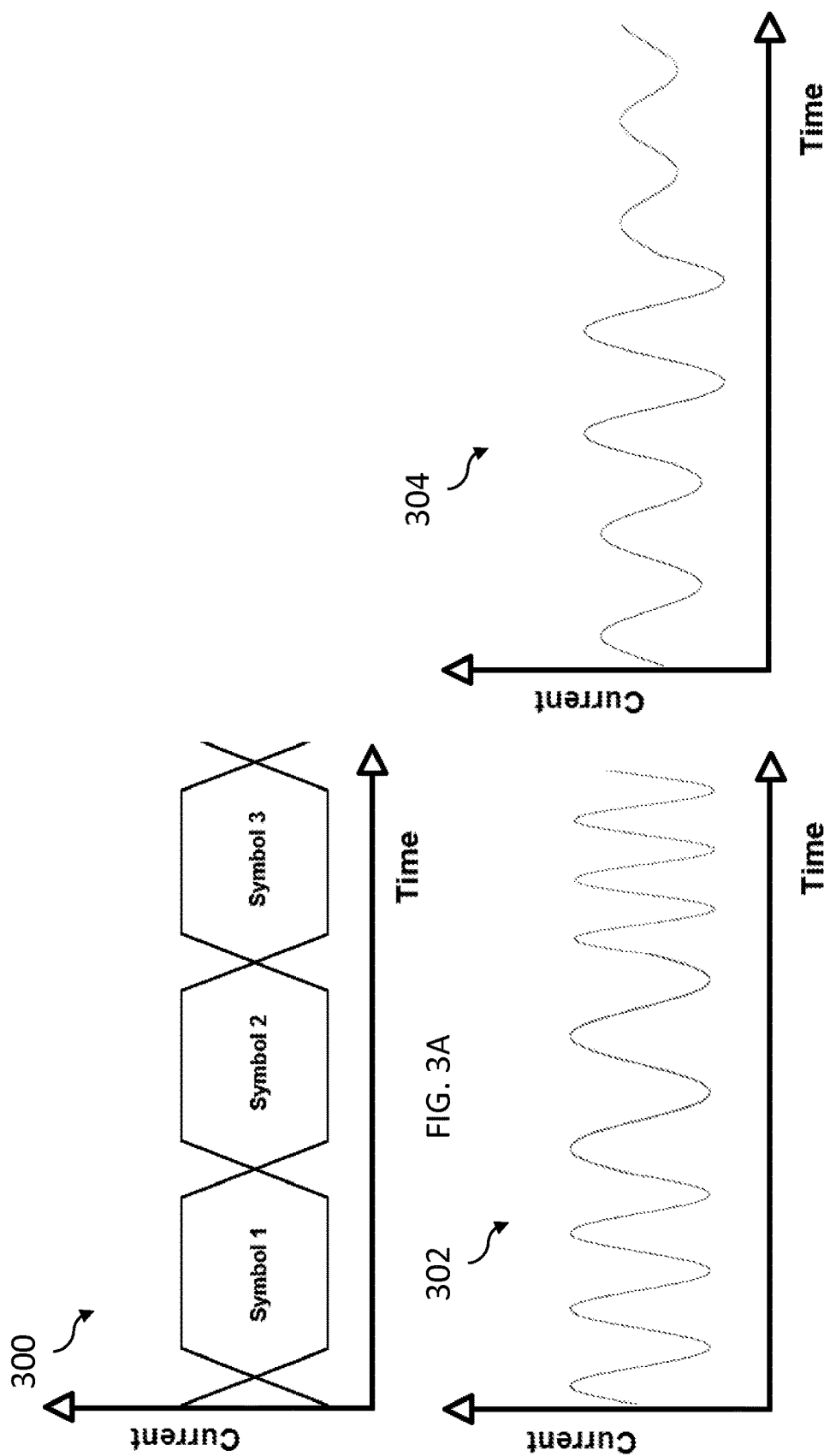

METHOD AND SYSTEM FOR OPTICAL COMMUNICATION

CROSS-REFERENCE TO RELATED APPLICATIONS

This application claims priority under 35 U.S.C. §119(e) to U.S. Provisional Application No. 61/831,380, entitled "Method and System for Optical Communication in the Presence of Optical Scanners", filed Jun. 5, 2013, the contents of which are incorporated by reference herein.

TECHNICAL FIELD

Embodiments of the present invention relate generally to light sources, including light-emitting diodes ("LEDs"), and, more specifically, to encoding information in the light emitted from the light sources.

BACKGROUND

LED-based lamps typically include a power converter (such as a transformer and/or rectifier) to convert an input AC mains voltage to a smaller DC voltage, driver circuitry to generate a constant current given the DC voltage, and LEDs that emit light when driven by the constant current. The driver circuitry may dim the LED by periodically and repeatedly "chopping" portions of the drive current down to zero amps; the nonzero portions of the drive current, however, remain at the constant level, effectively driving the LED with a series of constant-amplitude current pulses. By driving the LED with only one nonzero current value, the driver ensures the light output by the LED does not vary in color temperature.

Information may be encoded in the light output by the LED and transmitted therefrom in a similar fashion. The frequency or width of the constant-amplitude current pulses may be varied such that the changes in frequency and/or pulse width represent encoded information. One such technique, known as pulse-width modulation ("PWM"), samples an input data signal and represents its magnitude as a percentage of pulse width; maximum amplitude corresponds to 100% width, for example, while half amplitude corresponds to 50% width.

There are drawbacks to PWM-based LED driver circuits, however. The rapid switching may consume unnecessary power, and the frequency of switching may cause interference with other electronics. A need therefore exists for an improved method and system for transmitting information via light emitted by LEDs.

SUMMARY

Embodiments of the present invention include systems and methods for driving light sources with continuous-time data signals encoded with information such that the light output by the light source conveys this information. In one embodiment, the continuous-time data signal includes one or more frequencies; a driver circuit varies the current to an LED in accordance with these frequencies, thereby causing the light output to vary and transmit the data therein. A PWM signal that encodes the amplitude of a data signal as pulses of varying width may be filtered or converted to an analog signal and used to drive the LED; in other embodiments, the continuous-time data signal may be generated using oscillators or similar components and used directly to drive the LED. A power balancer may be used to match output power to input power, thereby eliminating or mitigating changes in light output due to the transmission of the information; a dimmer controller may be used to receive a dimming signal and adjust light output by the LED accordingly.

In one aspect, a system for transmitting data via light emitted by a light source includes a continuous-time data-signal source for generating a continuous-time data signal; a driver circuit for generating a drive signal, the drive signal having a drive voltage and a drive current, that provides power to the light source, thereby causing the light source to emit light, wherein variations in the amplitude of the drive signal represent information in the continuous-time data signal; and circuitry for (i) detecting a change in average power delivered to the light source as a result of the variations in the amplitude of the drive signal and for (ii) causing the driver circuit to vary the power delivered to the light source to compensate for the change in average power.

The light source may include a light-emitting diode. Variations in the amplitude of the drive signal may include frequencies less than 100 kHz, 10 kHz, or 1 kHz. The continuous-time data-signal source may include a pulse-width modulator generator for generating a pulse-width-modulated representation of the continuous-time data signal and a filter or digital-to-analog converter for removing a high-frequency component of the pulse-width-modulated representation of the continuous-time data signal to create the continuous-time data signal. The continuous-time data-signal source may include an oscillator and a mixer. The continuous-time data-signal may include a signal blending a plurality of frequencies and/or a plurality of symbols, each symbol represented by changes in frequency modulation. The circuitry for detecting the change in average power may include a comparator for comparing input power to power delivered to the light source. The circuitry for detecting the change in average power may include a current sensor to measure a current flowing in the light source. The circuitry for causing the driver circuit to vary the power delivered to the light source may include circuitry to change a DC offset of the drive signal or circuitry to change pulse widths of a pulse-width-modulated representation of the continuous-time data signal.

In another aspect, a method for transmitting data via light emitted by a light source includes generating, using a continuous-time data-signal source, a continuous-time data signal; generating, using a driver circuit, a drive signal, the drive signal having a drive voltage and a drive current, that provides power to the light source, thereby causing the light source to emit light, wherein variations in the amplitude of the drive signal represent information in the continuous-time data signal; detecting a change in average power delivered to the light source as a result of the variations in the amplitude of the drive signal; and causing the driver circuit to vary the power delivered to the light source to compensate for the change in average power.

The light source may include a light-emitting diode. A pulse-width-modulated representation of the continuous-time data signal may be generated and a high-frequency component of the pulse-width-modulated representation of the continuous-time data signal may be removed to create the continuous-time data signal. Detecting the change in average power delivered to the light source may include sensing a current flowing through the light source or sensing a voltage applied to the light source. Causing the driver circuit to vary the power delivered to the light source may include changing a DC offset of the drive signal or changing pulse widths of a pulse-width-modulated representation of the continuous-time data signal. A dimming signal may be received and the power provided to the light source may be adjusted accordingly.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which:

FIGS. 2A, 2B, 3A, 3B, and 3C illustrate examples of continuous-time data-signals in accordance with embodiments of the present invention;

DETAILED DESCRIPTION

Embodiments of the present invention include methods and systems for driving light sources, such as LEDs, using variable currents or voltages, wherein variations in the LED current or voltage are derived from a continuous-time data signal. Light output of LEDs may be linearly proportional to the current flowing in them over a wide bandwidth (e.g., 0-20 mA); an LED driven with a varying current will thus produce light having an intensity proportional to that current. Information encoded in the drive signal as changes in current amplitude or frequency is therefore transmitted as changes in light intensity. A remote receiver, such as a cellular telephone equipped with a camera or light sensor, may receive the emitted light and extract the transmitted information therefrom.

In various embodiments, the transmitter includes a power-balancer circuit that monitors received power and output power; if the output power changes as a result of the information-representative fluctuations in the LED drive current or voltage, the power-balancer circuit may adjust the output power accordingly until the output power matches the input power. In other embodiments, a dimmer controller receives a dimming signal and/or determines a desired dimming level by analyzing the phase of the input power signal (i.e., the amount of phase chopping) and increases or decreases output current accordingly.

Figure 1A:
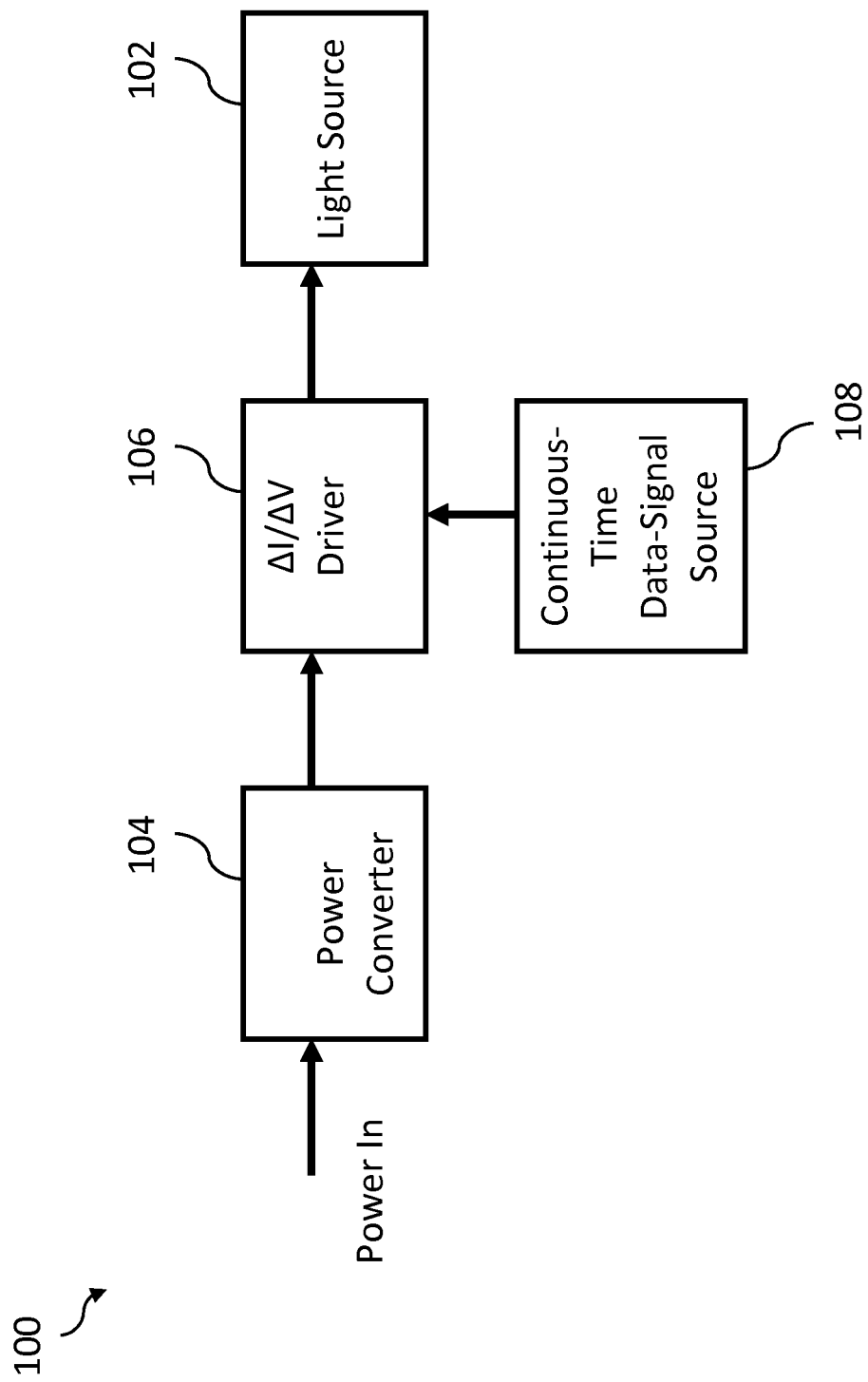
FIGS. 1A and 1B illustrates block diagrams of circuits for driving a light source with a continuous-time signals in accordance with embodiments of the present invention.

FIG. 1A illustrates a block diagram of a circuit 100 for transmitting information via light emitted from a light source 102. A power converter 104 receives power from a power source, such as an AC mains, battery, solar panel, or any other AC or DC source. The power converter 104 may include a magnetic transformer, electronic transformer, switching converter, rectifier, or any other similar type of circuit. One of skill in the art will understand that any circuitry for converting an input power signal into a power signal suitable for other devices in the circuit 100 is within the scope of the present invention. In some embodiments, the power converter 104 is not necessary because the input power signal does not require conversion.

The circuit 100 includes a driver circuit 106 that provides power to the light source 102. The driver circuit 106 may include an AC or DC current source or voltage source, a regulator, an amplifier (such as a linear amplifier or switching amplifier), a buck, boost, or buck/boost converter, or any other similar type of circuit or component. The present invention is not limited to any particular type of driver circuit. The driver circuit 106 outputs a variable voltage or current to the light source 102. The variable voltage or current may include a DC offset, such that its average value is nonzero, and a variable portion, such as an AC ripple, that represents information. In one embodiment, the frequency of the AC signal represents the information. The driver circuit 106 may be controlled by a continuous-time data-signal source 108. The signal source 108 may be any analog, digital, or mixed-signal circuit capable of generating an output signal. As explained in greater detail below, the signal source 108 may include a pulse-width modulation ("PWM") generator, a filter, a digital-to-analog converter ("DAC"), an oscillator, a mixer, or any other type of similar circuit. The signal source 108 may instead or in addition include a receiver, such as a network interface, for receiving the data signal from an external source. The continuous-time data signal may be any time- or frequency-varying signal having a value that corresponds at all or most points in time to assigned information; in other words, the continuous-time data signal is not modulated, pulsed, chopped, or otherwise altered from its original value(s). In one embodiment, the continuous-time data signal is a baseband signal that is not modulated with a high-frequency carrier signal.

Figure 1B:
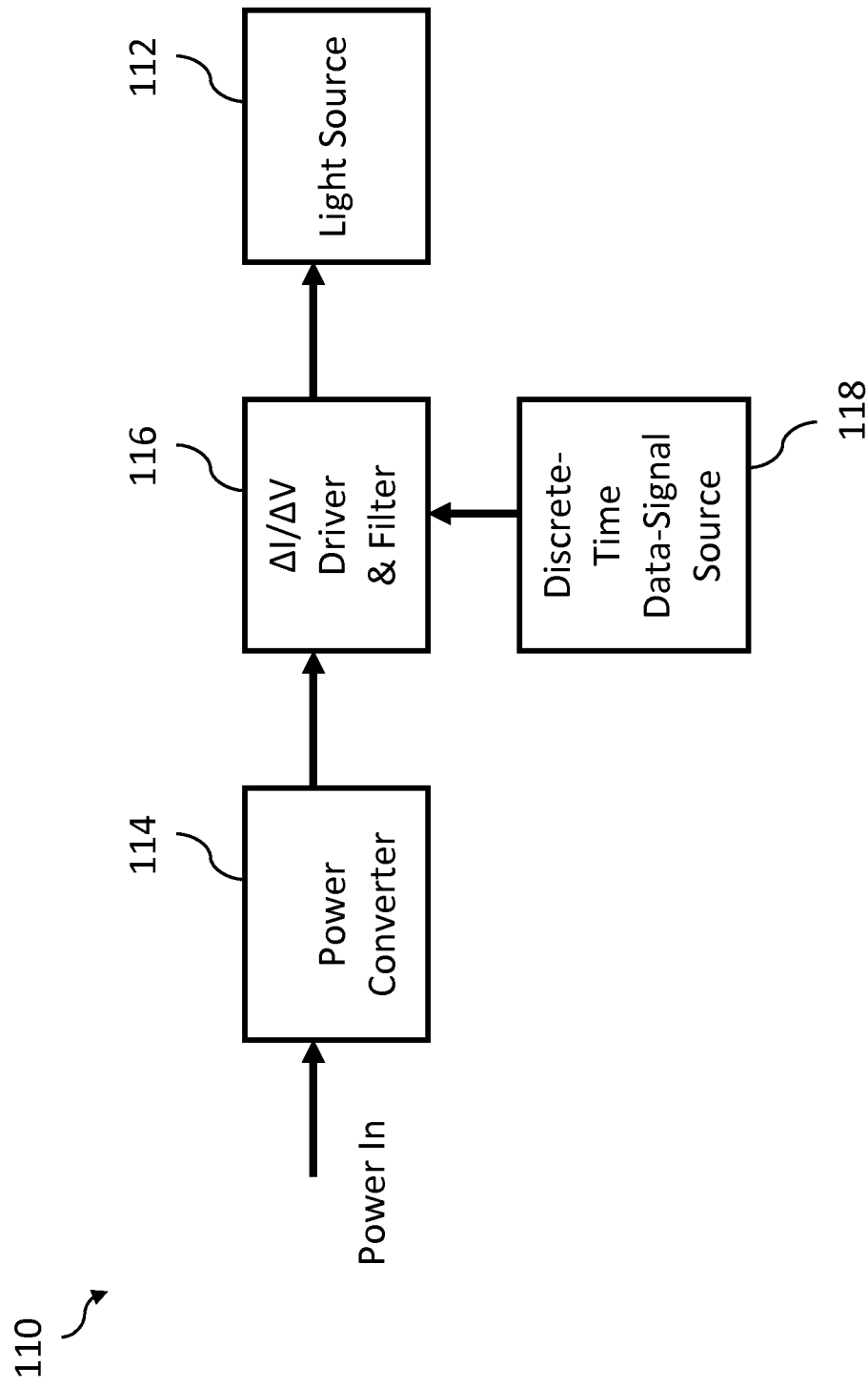

In an alternative embodiment, as shown in FIG. 1B, a circuit 110 includes a discrete-time data-signal source 118, which may generate a PWM or similar signals. The driver 116 receives the PWM signal and generates a continuous-time driver signal to power the light source 112. In other words, the filtering is performed after the driver receives the data signal instead of before, as described above with reference to FIG. 1A.

FIGS. 2A and 2B illustrate two examples of continuous-time data signals. A first signal 200 comprises a DC offset (i.e., its average value is greater than zero) and a sine wave oscillating at a frequency. A second signal 202 also includes a DC offset; the variations in this signal are generated by mixing two sine waves of different frequencies. In other embodiments of the present invention, any number of periodic signals may be combined to produce the continuous-time data signal.

In these examples, current is shown to vary; in other examples, the voltage may similarly vary. The signals 200, 202 may represent the output of the signal source 108 or the output of the driver circuit 106. In one embodiment, the driver circuit 106 receives a time-varying voltage signal from the data source 108 and outputs a corresponding time-varying current signal to the light source 102.

FIGS. 3A, 3B, and 3C illustrate other embodiments of the continuous-time data signal. In these embodiments, the frequency and/or amplitude of the continuous-time data signal may be modulated to encode different information at different points in time. For example, as shown by the data representation 300 in FIG. 3A, three different data symbols may be sent at different points in time. The symbols may correspond to members of a library of symbols, such as binary digits, hexadecimal digits, or any other type of symbol. In one embodiment, as shown in FIG. 3B, a frequency-modulated signal 302 is used to represent the different symbols; a different frequency is assigned to each symbol, and the symbol is transmitted by selecting the appropriate frequency. In another embodiment, as shown in FIG. 3C, an amplitude-modulated signal is used to represent the different symbols.

The frequency of the signals 200, 202, 302, 304 may vary within a range; in one embodiment, the frequency range is 1-1000 Hz, but any frequency is within the scope of the present invention. The signal 200 may oscillate at 500 Hz, for example, and the signal 202 may be the combination of a 400 Hz signal and a 600 Hz signal. The different symbols 300 may correspond to different frequencies or frequency ranges, such as 100 Hz for a first symbol and 200 Hz for a second symbol. Any assignment of frequencies or combinations thereof is within the scope of the present invention. In one embodiment, the frequencies used are sufficiently high (greater than, e.g., 200 Hz or 300 Hz) such that a human eye cannot perceive any fluctuations in light intensity or temperature in light emitted from light sources driven at those frequencies.

Figure 4:
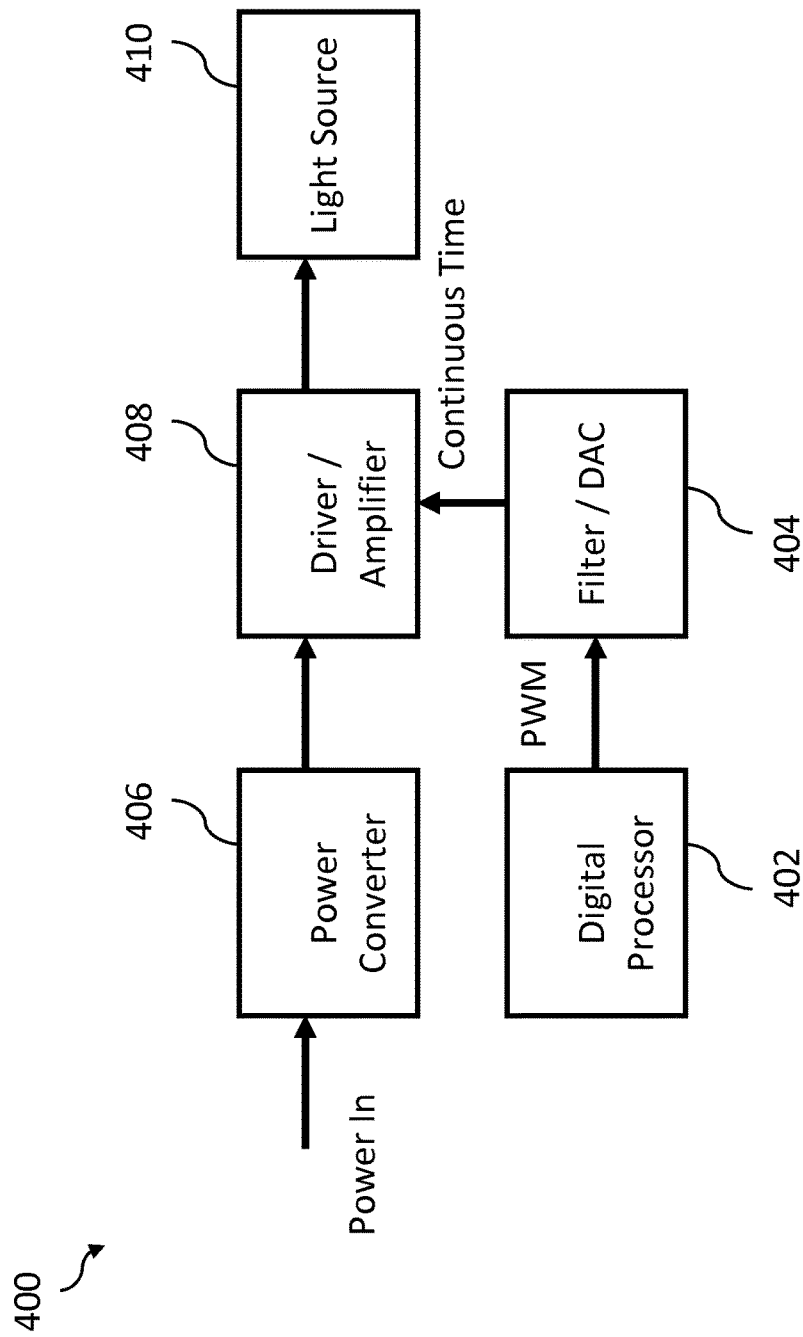
FIG. 4 illustrates a block diagram of a circuit that generates a continuous-time data-signal based on a PWM signal in accordance with embodiments of the present invention.
Figure 5:
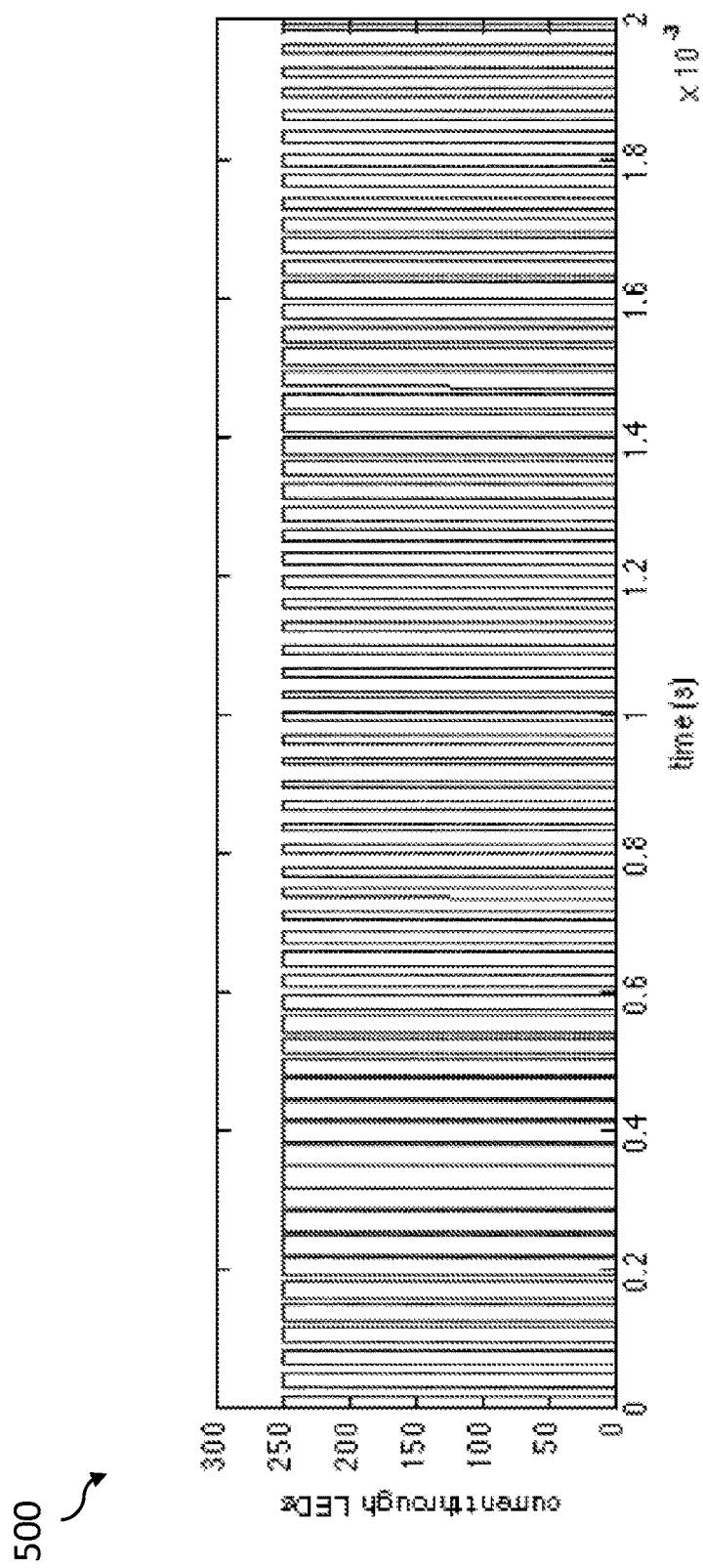
FIG. 5 illustrates an example of a PWM signal.

FIG. 4 is a block diagram of a circuit 400 that generates the continuous-time data signal using a PWM generator 402. The PWM generator may be a digital processor, microcontroller, digital-signal processor, FPGA, ASIC, or any other type of digital circuit. The PWM signal output by the PWM generator 402 may include pulses that vary in width in accordance with an amplitude of an input data signal, such as the PWM signal 500 shown in FIG. 5.

Figure 6:
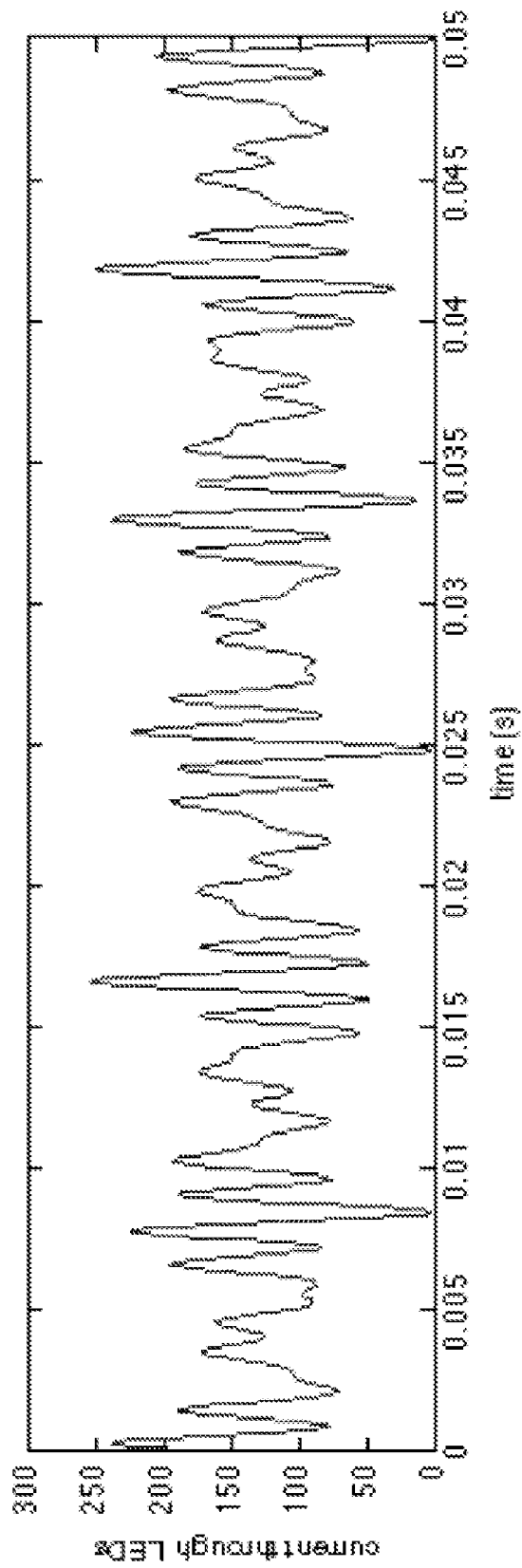
FIG. 6 illustrates an example of a continuous-time data signal generated from a PWM signal.

The PWM signal may be received by a filter or a DAC 404 to remove high-frequency components therein. The filter may be, for example, a low-pass or notch filter, and may include capacitors, inductors, resistors, or any other such components. The DAC may be any type of circuit that samples the PWM signal at intervals and outputs a voltage or current indicative of the level, pulse width, or frequency of the PWM signal. An example of a continuous-time data signal 600 derived from the example PWM signal 500 is shown in FIG. 6. The circuit 400 may also include the power converter 406, driver/amplifier 408, and light source 410 discussed above.

In another embodiment, the filter/DAC 404 may filter and/or sample the PWM signal after it has been amplified by the driver/amplifier 408 (instead of, or in addition to, the filtering/sampling performed on the PWM signal output by the PWM generator 402). In this embodiment, the amplifier 408 is a switching amplifier and receives the PWM signal at one or more switch-control terminals. Then one or more inductors and capacitors are used to filter the output of these switches to remove the high-frequency components.

Figure 7:
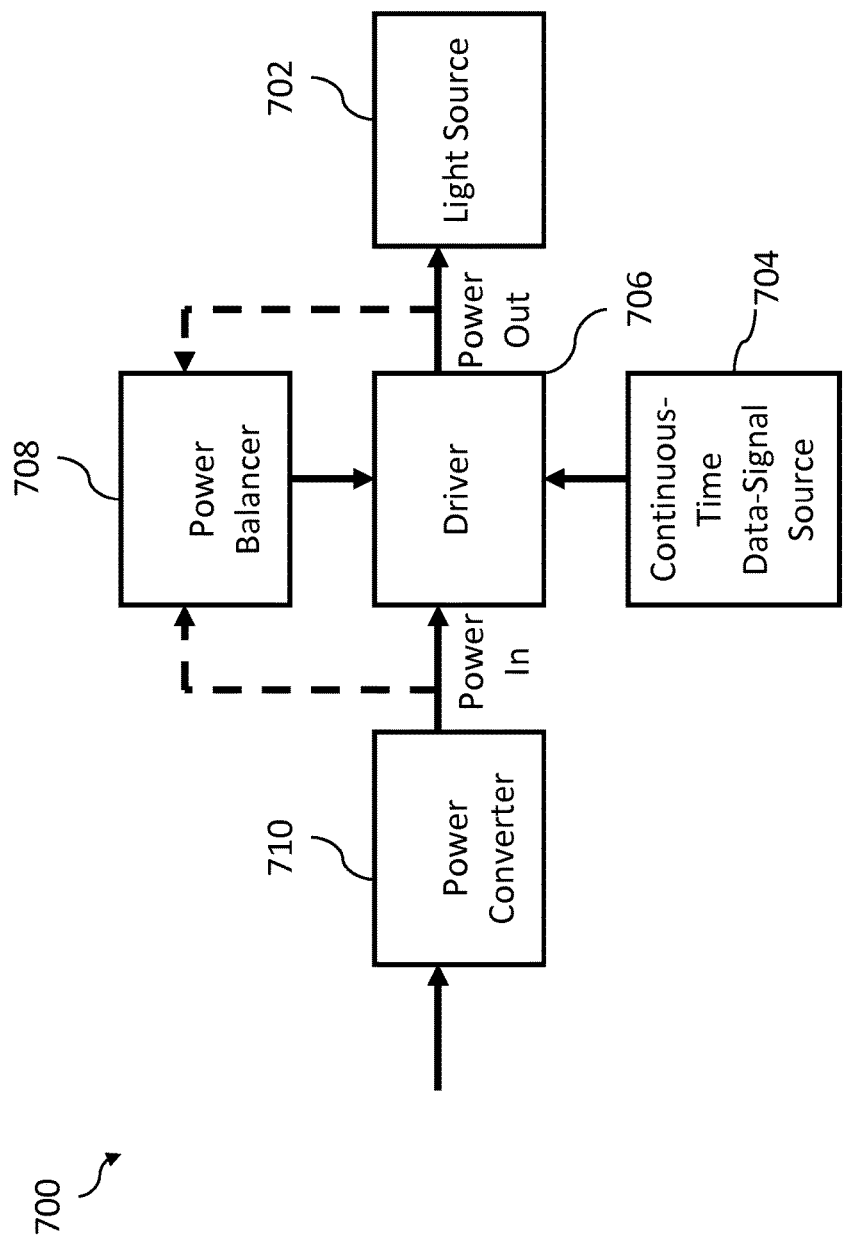
FIG. 7 illustrates a block diagram of a circuit that balances power in and power out in accordance with embodiments of the present invention.

Referring now to FIG. 7, the light source 702 may be designed to output a certain amount of lumens of light energy given a certain, fixed input voltage or current. The light output of the light source 702 may be increased or reduced, however, if it is driven with a time-varying voltage or current, as described above. In one embodiment, the data source 704 selects a DC offset for the generated continuous-time signal such that the average value of the generated current or voltage matches that of an equivalent fixed voltage or current. For example, if the light source is rated to be driven with a constant current of 20 mA, the signal source 704 and driver 706 may be configured to generate a time-varying drive current that has a maximum value of 25 mA, a minimum value of 15 mA, and an average value of 20 mA.

In another embodiment, the light source 702 is driven with a voltage or current having an average value less than its rated or usual value. For example, if the light source 702 is rated to be driven with a constant current of 20 mA, the time-varying drive current may vary between 10 mA and 20 mA and have an average value of 15 mA. If the data source 704 is shut off for any reason (i.e., no data is being sent), the driver 706 may hold the drive current at the average value (e.g., 15 mA) instead of increasing it to the normal or rated value (e.g., 20 mA) to thereby avoid large swings in light output if the data source 704 is temporarily or permanently disabled.

In one embodiment, a power balancer 708 monitors input power (by, e.g., monitoring an input voltage or current or an output voltage or current of the power converter 710) and output power delivered to the light source 702 (by, for example, monitoring a voltage or current in the light source 702). The power balancer may include an averaging circuit, integrator, or similar circuit element for tracking the history of a signal. If the average or instantaneous output power is greater or lesser than the input power, the power balancer 708 may instruct the driver 706 and/or data source 704 to increase or decrease the drive current or voltage delivered to the light source. In one embodiment, the driver 706 includes a constant-current driver and a switching amplifier; the voltage of the light source 702 is measured and used to set a DC voltage level such that the voltage at the input to the switching amplifier equals the voltage of the light source 702. In another embodiment, the driver 706 includes a constant-voltage driver and the DC level is set using a voltage reference; the time-varying signal is added thereto. In another embodiment, the signal source 704 includes a PWM generator (as described above). The PWM signal may be modified to include not just the continuous-time data signal but also the pulse-width values necessary to provide an average DC current to the light source 702.

The power balancer 708 is depicted as a separate block in FIG. 7, but one of skill in the art will understand that some or all of its functionality may be implemented as part of the light source 702, driver 706, or data source 704. In particular, its functionality may be included in a PWM modulator, as discussed above.

Figure 8:
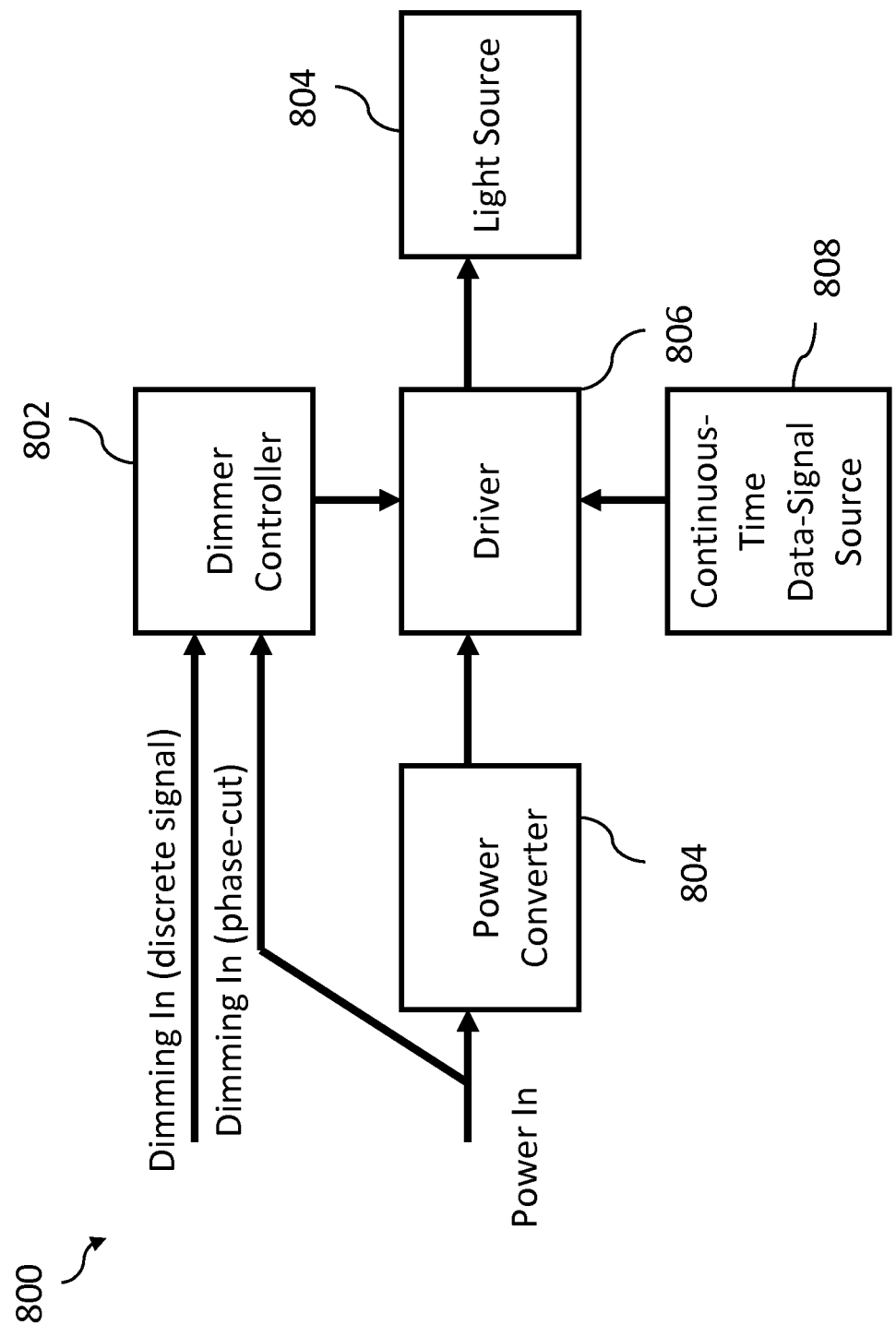
FIG. 8 illustrates a block diagram of a circuit that dims a light source in accordance with a dimming input in accordance with embodiments of the present invention.

FIG. 8 illustrates a circuit 800 that includes a dimmer controller 802. As one of skill in the art will understand, the light source 804 may be dimmed by an "upstream" phase-cut/chop dimmer circuit, which may set greater or lesser portions of each cycle of an input 60 Hz power signal to zero. The dimmer controller 802 may, in other embodiments, receive a discrete dimming signal. In these and other embodiments, the dimmer controller 802 may instruct the driver 806 and/or signal source 808 to increase or decrease an average power delivered to the light source 804 accordingly. For example, if an average current level delivered to the light source 804 is 20 mA and the dimmer controller 802 detects that 50% of the input power has been chopped by a phase-cut dimmer, the dimmer controller 802 may control the driver 806 to reduce the average power to 10 mA (e.g., 50% of nominal current). The drive current may similarly be adjusted to 5 mA if 75% of the input power has been chopped and to 15 mA if 25% of the input power has been chopped. Similarly, if the discrete dimming input includes a voltage in a range of voltages, the dimmer controller 802 may determine where in the range the voltage lies and adjust the output power level accordingly.

The dimmer controller 802 may work in tandem with the power balancer 708 mentioned above with reference to FIG. 7. Because the power balancer 708 may resist changes in output power, it may resist dimming even when a user intends for the light source 804 to dim. In one embodiment, when the dimmer controller 802 detects that an input dimming signal is active, the power balancer 708 temporarily shuts off in order for the power level delivered to the light source 804 to change. Once the input dimming signal has ceased changing, the power balancer 708 may then re-engage and continue monitoring output power. In other embodiments, the power balancer 708 performs some or all of the functionality of the dimmer controller 802 in that, if the input power is chopped by an upstream phase-cut dinner, the power balancer 708 may accordingly adjust the output power to match.

Figure 9:
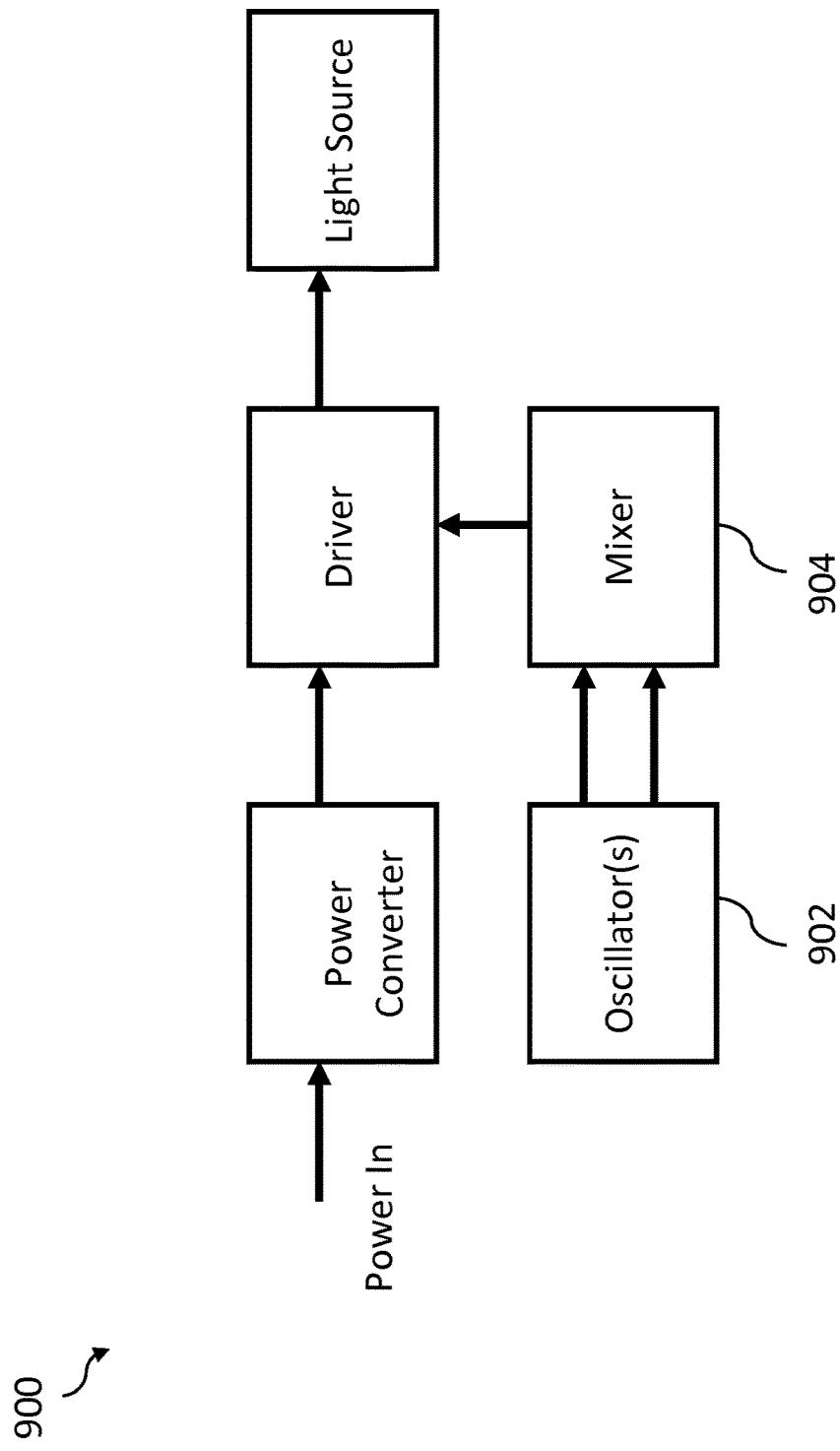
FIG. 9 illustrates a block diagram of a circuit that generates a continuous-time data-signal using an oscillator in accordance with embodiments of the present invention.

FIG. 9 illustrates another embodiment 900 of the present invention. In this embodiment, one or more oscillators 902 generate one or more oscillating signals, such as the signal 200 appearing in FIG. 2A, and a mixer 904 may combine the signals to form a multi-frequency signal such as the signal 202 appearing in FIG. 2B. The oscillator 902 and/or mixer 904 may be made using digital or analog components. Unlike the PWM-based embodiment 400 appearing in FIG. 4, the present embodiment 900 may not generate a high-frequency signal and later filter the signal to remove high-frequency components; instead, only low-frequency signals (e.g., 1-1000 Hz) are generated, and filtering may not be necessary.

Certain embodiments of the present invention were described above. It is, however, expressly noted that the present invention is not limited to those embodiments, but rather the intention is that additions and modifications to what was expressly described herein are also included within the scope of the invention. Moreover, it is to be understood that the features of the various embodiments described herein were not mutually exclusive and can exist in various combinations and permutations, even if such combinations or permutations were not made express herein, without departing from the spirit and scope of the invention. In fact, variations, modifications, and other implementations of what was described herein will occur to those of ordinary skill in the art without departing from the spirit and the scope of the invention. As such, the invention is not to be defined only by the preceding illustrative description.

What is claimed is:

1. A system for transmitting data via light emitted by a light source, the system comprising:
    a continuous-time data-signal source for generating a continuous-time data signal, the continuous-time data signal including at least a sinusoidal signal;
    a driver circuit for generating a drive signal, the drive signal having a drive voltage and a drive current, that provides power to the light source, thereby causing the light source to emit light, wherein variations in the amplitude of the drive signal represent information in the continuous-time data signal; and
    circuitry for (i) detecting a change in average power delivered to the light source as a result of the variations in the amplitude of the drive signal and for (ii) causing the driver circuit to vary the power delivered to the light source to compensate for the change in average power.

2. The system of claim 1, wherein the light source comprises a light-emitting diode.

3. The system of claim 1, wherein the variations in the amplitude of the drive signal comprise frequencies less than 100 kHz, 10 kHz, or 1 kHz.

4. The system of claim 1, wherein the continuous-time data-signal source comprises a pulse-width modulator generator for generating a pulse-width-modulated representation of the continuous-time data signal and a filter or digital-to-analog converter for removing a high-frequency component of the pulse-width-modulated representation of the continuous-time data signal to create the continuous-time data signal.

5. The system of claim 1, wherein the continuous-time data-signal source comprises an oscillator and a mixer.

6. The system of claim 1, wherein the continuous-time data-signal comprises a signal blending a plurality of frequencies.

7. The system of claim 1, wherein the continuous-time data-signal comprises a plurality of symbols, each symbol represented by changes in frequency modulation.

8. The system of claim 1, wherein the circuitry for detecting the change in average power comprises a comparator for comparing input power to power delivered to the light source.

9. The system of claim 1, wherein the circuitry for detecting the change in average power comprises a current sensor to measure a current flowing in the light source.

10. The system of claim 1, wherein the circuitry for causing the driver circuit to vary the power delivered to the light source comprises circuitry to change a DC offset of the drive signal or circuitry to change pulse widths of a pulse-width-modulated representation of the continuous-time data signal.

11. A method for transmitting data via light emitted by a light source, the method comprising:
    generating, using a continuous-time data-signal source, a continuous-time data signal, the continuous-time data signal including at least a sinusoidal signal;
    generating, using a driver circuit, a drive signal, the drive signal having a drive voltage and a drive current, that provides power to the light source, thereby causing the light source to emit light, wherein variations in the amplitude of the drive signal represent information in the continuous-time data signal;
    detecting a change in average power delivered to the light source as a result of the variations in the amplitude of the drive signal; and
    causing the driver circuit to vary the power delivered to the light source to compensate for the change in average power.

12. The method of claim 11, wherein the light source comprises a light-emitting diode.

13. The method of claim 11, further comprising generating a pulse-width-modulated representation of the continuous-time data signal and removing a high-frequency component of the pulse-width-modulated representation of the continuous-time data signal to create the continuous-time data signal.

14. The method of claim 11, wherein detecting the change in average power delivered to the light source comprises sensing a current flowing through the light source or sensing a voltage applied to the light source.

15. The method of claim 11, wherein causing the driver circuit to vary the power delivered to the light source comprises changing a DC offset of the drive signal or changing pulse widths of a pulse-width-modulated representation of the continuous-time data signal.

16. The method of claim 11, further comprising receiving a dimming signal and adjusting the power provided to the light source accordingly.

* * * * *